United States Patent [19]

Menniti et al.

[11] Patent Number: 4,695,786

[45] Date of Patent: Sep. 22, 1987

[54] VOLTAGE REGULATOR FOR AN ALTERNATOR HAVING AN AUXILIARY STAGE FOR STARTING THE ALTERNATOR AT A LOW ROTATIONAL SPEED

[75] Inventors: Pietro Menniti, Milan; Fabio Marchio, Busto Arsizio, both of Italy

[73] Assignee: SGS Microelettronica SpA, Agrate Brianza, Italy

[21] Appl. No.: 865,026

[22] Filed: May 20, 1986

[30] Foreign Application Priority Data

May 20, 1985 [IT] Italy ............................... 20797 A/85

[51] Int. Cl.$^4$ ............................ G05F 5/00; H02P 9/10
[52] U.S. Cl. .................................. 323/303; 323/275; 322/60
[58] Field of Search ............... 323/274, 275, 299, 303; 322/60, 88, 89

[56] References Cited

U.S. PATENT DOCUMENTS 4,301,376 11/1981 Ragaly ................................ 322/88
4,556,838 12/1985 Brasseur ............................ 323/299

Primary Examiner—Patrick R Salce
Assistant Examiner—Judson H. Jones
Attorney, Agent, or Firm—Wenderoth, Lind & Ponack

[57] ABSTRACT

A voltage regulator for an alternator has an integrated actuator stage consisting of a Darlington transistor pair and includes an auxiliary stage which, at the time of starting of the alternator, causes a low voltage drop across the actuator stage by causing only one of the two transistors in the Darlington transistor pair to conduct. This provides, at the exciter winding of the alternator, disposed in series with the actuator stage, the current required for the starting of the alternator at a low rotational speed.

1 Claim, 3 Drawing Figures

VOLTAGE REGULATOR FOR AN ALTERNATOR HAVING AN AUXILIARY STAGE FOR STARTING THE ALTERNATOR AT A LOW ROTATIONAL SPEED

BACKGROUND OF THE INVENTION

The present invention relates to a voltage regulator for an alternator, and in particular to a regulator of the monofunction type for a nine-diode alternator which may be used in automotive applications.

It is known that in regulation systems of the monofunction type, the exciter winding of the alternator and the voltage regulator which drives it are supplied by the stator windings of the alternator via an auxiliary trio of diodes and that a breakdown warning lamp is inserted between the trio of diodes and the main switch (ignition key of the vehicle).

The current art provides for the construction of the regulator as an integrated circuit with the exception of its actuator stage which is of discrete components.

This stage comprises a pair of transistors in the Darlington configuration, rather than an individual transistor, to provide a high current gain, and is disposed in series with the exciter winding of the alternator. At the time of starting, the alternator does not supply current and the exciter winding and the regulator are supplied with current by the battery via the lamp. In this case, the voltage drop of the Darlington pair of the actuator stage must be sufficiently low to provide the excitation current required for the starting of the alternator at a low rotational speed.

The voltage drop in an integrated Darlington pair is usually greater, for technical reasons, than in a discrete Darlington pair which makes starting of the alternator critical. This leads to the need to integrate the actuator stage together with the other parts of the regulator.

SUMMARY OF THE INVENTION

The object of the present invention is to construct a voltage regulator of the monofunction type for an alternator of the nine-diode type, whose actuator stage is formed as an integrated circuit and gives rise to a comparatively low voltage drop at the time of starting of the alternator.

This object is achieved by the voltage regulator defined and set out in the claims attached to this description.

This object may be effected by providing a voltage regulator for an alternator having first and second supply terminals and comprising a control stage connected between said first and second supply terminals and having an output terminal connected to a base of a first transistor of a pair of transistors forming part of an actuator stage of said regulator, said pair of transistors being connected together in a Darlington configuration and having their collectors connected to an exciter winding of said alternator, the improvement comprising an auxiliary stage connected between said first and second supply terminals, and having an output terminal connected to a base of a second transistor of said pair of transistors of said actuator stage and comprising a determining circuit means for determining a reference voltage and control circuit means for causing said second transistor of said pair of transistors to conduct when a voltage between said first and second supply terminals is lower than said reference voltage, thereby reducing a voltage drop across said pair of transistors.

BRIEF DESCRIPTION OF THE DRAWINGS

The invention will be described below in detail, purely by way of non-limiting example, with reference to the attached drawings in which.

The same reference numerals and letters are used for corresponding components in the drawing figures.

DESCRIPTION OF THE PREFERRED EMBODIMENT

Figure 1:
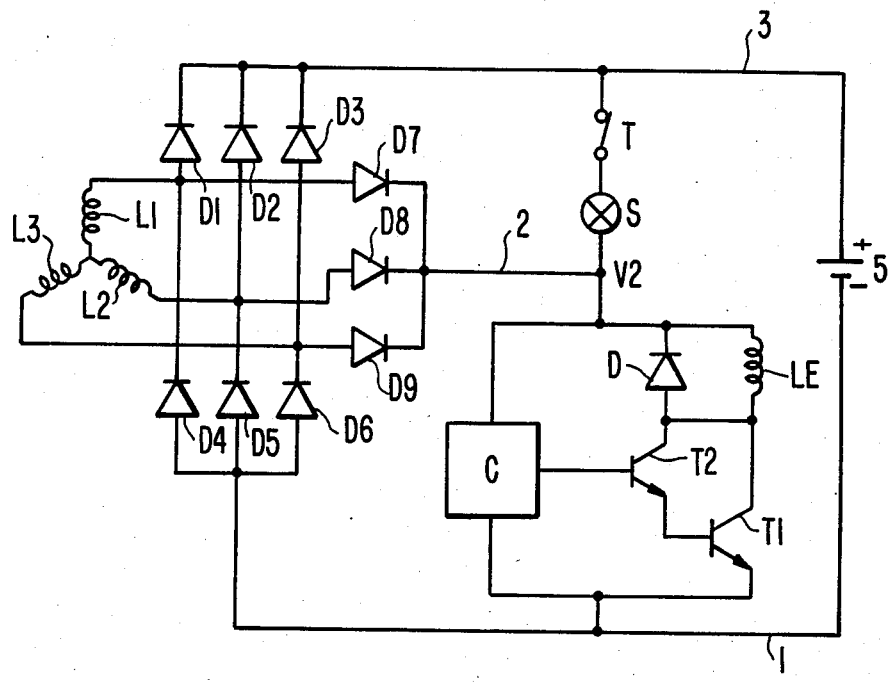
FIG. 1 is a simplified electrical diagram of a monofunction voltage regulator of a known type inserted in an electrical energy generator having a nine-diode alternator for use in vehicles.
Figure 3:
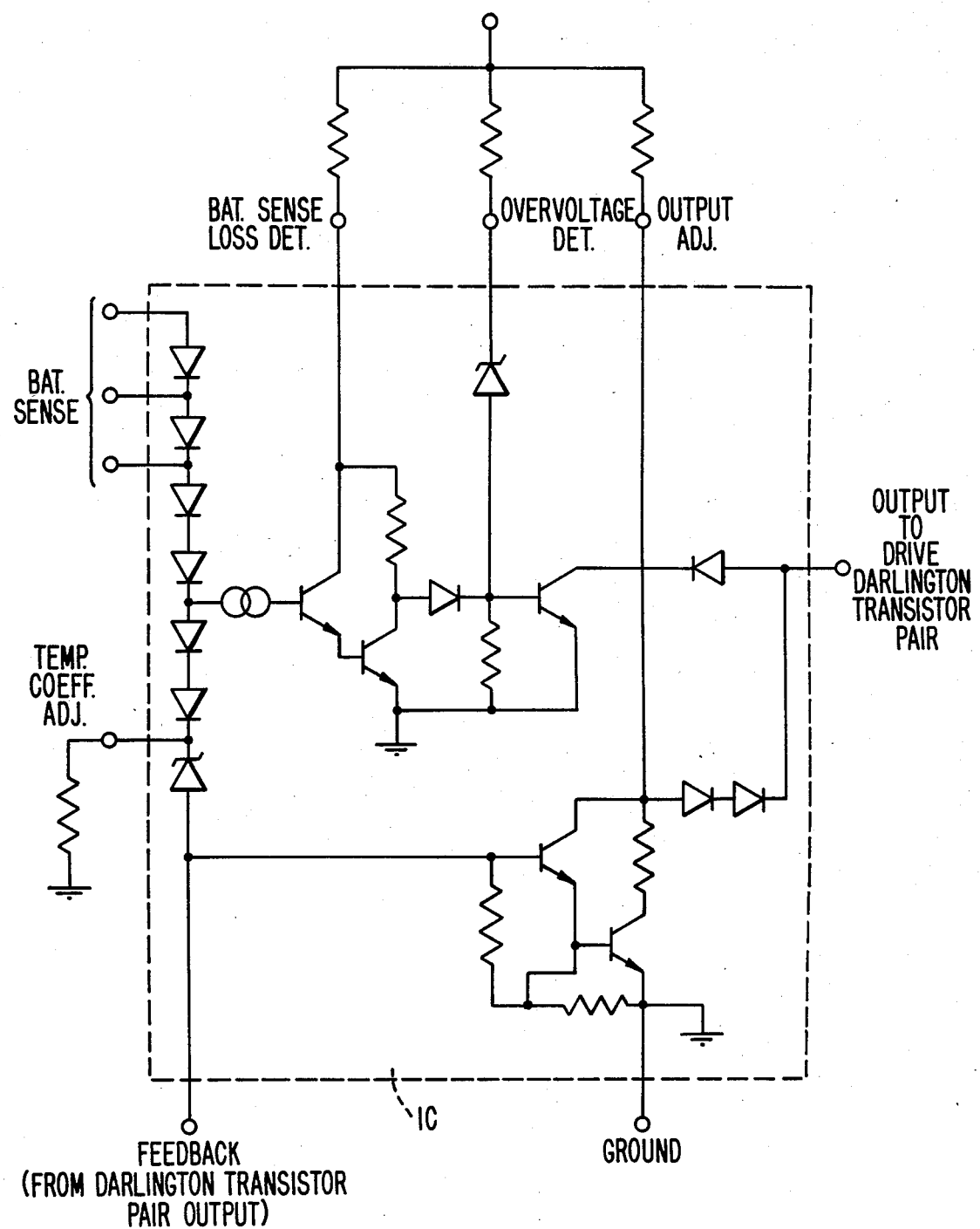
FIG. 3 is an electrical diagram of a known circuit which may be used as the control stage C of FIGS. 1 and 2.

The circuit shown in FIG. 1 comprises three windings L1–L3 of a stator of an alternator connected to six rectifier diodes D1–D6 so as to form two output terminals 1 and 3 of the generator between which a unidirectional voltage is produced. The terminal 3 is the positive terminal and the terminal 1 the negative terminal of the generator. A battery 5 is connected to these output terminals and forms the supply source for the electrical loads of the vehicle, not shown for the sake of simplicity in FIG. 1, when the alternator is not supplying current, while it forms a load for the alternator during its operation. The three windings L1–L3 are also connected to three auxiliary rectifier diodes D7–D9 which are connected together so as to form an auxiliary terminal 2. The terminals 2 and 1 form a first and a second supply terminal of an exciter winding LE of the alternator and the voltage regulator of the alternator. The exciter winding LE is connected, on one hand, to the terminal 2 and, on the other hand, to the collector of an NPN transistor T1. A freewheeling diode D having its cathode connected to the terminal 2 is connected in parallel with the winding LE. The transistor T1 is connected to an NPN transistor T2 in order to form Darlington configuration which forms part of an actuator stage of the voltage regulator of the alternator. The emitter of T1 is connected to the terminal 1 and its base is connected to the emitter of T2, which has its collector connected to the collector of T1 and its base connected to an output terminal of a control stage of the voltage regulator, shown by a block C in FIG. 1, connected between the output terminals 2 and 1 of the generator. FIG. 3 illustrates a known circuit which may be utilized for the control stage C. The element IC is a commercially available MOTOROLA MC 3325 voltage regulator integrated circuit. The operation of the circuit illustrated in FIG. 3 is discussed in detail on pages 55–58 of the July 1978 issue of Popular Electronics. Since the configuration of the control stage C is known to persons skilled in the art, a detailed description thereof has been omitted for the sake of brevity.

A breakdown warning lamp S is inserted between the terminal 2 and an ignition switch T of the vehicle, which is connected to the positive terminal 3 of the generator.

During operation, the control stage C of the regulator acts on the Darlington transistors T1–T2 so as to regulate the supply current of the exciter winding LE to a predetermined value which corresponds to a predetermined current supplied by the alternator.

During operation of the alternator, the terminals 2 and 3 are at the same voltage, as a result of which the lamp S is off and the exciter winding LE and the regulator are supplied by the alternator via the auxiliary terminal 2. On starting, the alternator does not supply current and the exciter winding and the regulator are supplied by the battery via the terminal 3 which illuminates the lamp, the voltage V2 at the terminal 2 being the difference between the voltage supplied by the battery to the terminals 3 and 1 and the voltage drop across the lamp S. In this situation, the voltage drop across the Darlington transistors T1-T2, which is the sum of the collector-emitter voltage of T2 and the base-emitter voltage of T1, must be sufficiently low to provide for the excitation current required for the starting of the alternator at a low rotational speed. In the current art, the actuator stage is formed by a discrete Darlington pair configuration which gives rise to a voltage drop of some 0.8 V which satisfies this condition. Using conventional integration techniques, however, an integrated circuit Darlington pair would cause a voltage drop of some 1.2 V which is too high and does not enable the correct starting of the alternator. This problem is solved, in accordance with the present invention, by adding an auxiliary stage to the regulator, which reduces the voltage drop across the actuator stage during the starting of the alternator.

Figure 2:
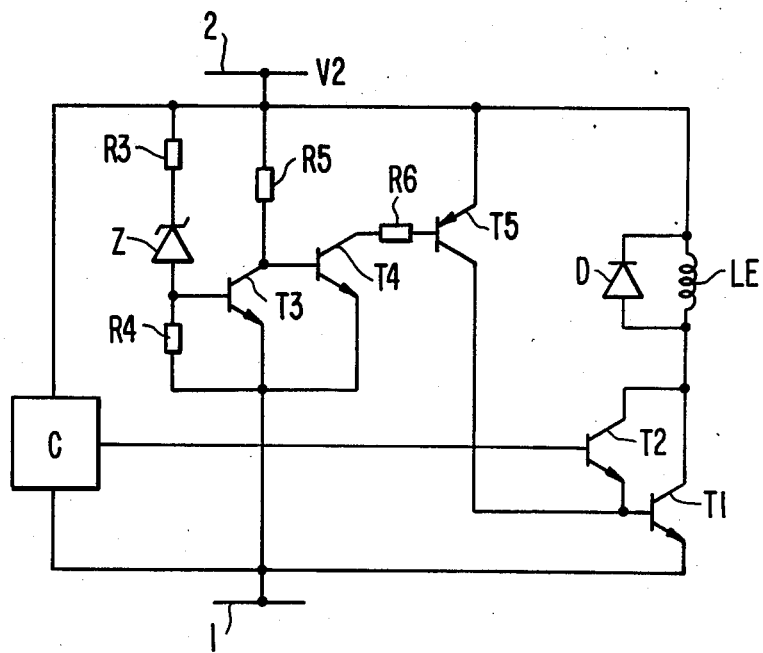
FIG. 2 is a simplified electrical diagram of a monofunction voltage regulator modified in accordance with the present invention.

The regulator in accordance with the present invention is shown in FIG. 2 and includes an auxiliary stage formed by two NPN transistors T3 and T4, and a PNP transistor T5, and a Zener diode Z, and four resistors R3, R4, R5, and R6. The transistor T5 has its emitter connected to the terminal 2 and its collector, which forms an output terminal of the auxiliary stage, connected to the base of the transistor T1. The base of T5 is connected to the collector of the transistor T4 via the resistor R6. The base of T4 is connected to the collector of the transistor T3 and, via the resistor R5, to the terminal 2. The emitters of T3 and T4 are connected to the terminal 1. The base of T3 is connected to the anode of the Zener diode Z and, via the resistor R4, to the terminal 1. The cathode of Z is connected to the terminal 2 via the resistor R3. On starting, the voltage at the terminal 2 is lower than a predetermined reference voltage which is needed to cause the triggering (i.e.—conduction) of the Zener diode Z. Therefore, no base current flows in the transistor T3 and it remains cut off. A base current flows in the transistor T4 and it therefore conducts so as to drive the transistor T5, and therefore causes the transistor T1 of the Darlington configuration to conduct, while the transistor T2 remains cut off, i.e.—the actuator stage of the regulator operates as though it were formed by a single transistor rather than a Darlington pair, which results in a considerable reduction in the voltage drop across this stage, with the result that the current through the winding LE is sufficiently high to enable the starting of the alternator at a low rotational speed.

With a regulator of the type illustrated in FIG. 2, having an integrated actuator stage, the voltage drop between the collector and emitter of T1 on starting is approximately 0.4 V which provides an improved starting of the alternator with respect to a conventional regulator having a discrete actuator stage which, as mentioned above, has a voltage drop of some 0.8 V.

When the voltage at the terminal 2 exceeds the value which causes the triggering (i.e.—conduction) of the Zener diode Z, the transistor T3 begins to conduct, thus causing the transistors T4 and T5 to be cut off. The control stage C drives T2 so as to cause it to conduct and as a result, the regulator operates in the normal way.

An auxiliary stage of the type shown in FIG. 2 is simple to construct and, since it is formed by components having a very low dissipation with respect to the components of the actuator stage (which is typically a power stage), occupies a comparatively small area some twenty times smaller than the area occupied by the Darlington configuration T1-T2. For the same reason, the power dissipation of the transistor T3 during normal operation of the alternator is negligible with respect to the currents involved in the regulator.

The lower voltage drop across the actuator stage at the time of starting also improves the operation of the breakdown warning lamp S with respect to the prior art arrangements.

We claim:

1. In a voltage regulator for an alternator having first and second supply terminals and comprising a control stage connected between said first and second supply terminals and having an output terminal connected to a base of a first transistor of a pair of transistors forming part of an actuator stage of said regulator, said pair of transistors being connected together in a Darlington configuration and having their collectors connected to an exciter winding of said alternator, the improvement comprising an auxiliary stage connected between said first and second supply terminals, and having an output terminal connected to the base of a second transistor of said pair of transistors of said actuator stage and comprising a determining circuit means for determining a reference voltage and control circuit means for causing said second transistor of said pair of transistors to conduct when a voltage between said first and second supply terminals is lower than said reference voltage, thereby reducing a voltage drop across said pair of transistors; wherein said first transistor of said pair of transistors of said actuator stage has its emitter connected to said base of the second transistor of said pair of transistors, and wherein said determining circuit means of said auxiliary stage comprises at leat one resistor and at least one Zener diode disposed in series and connected between said first supply terminal and a base of a third transistor forming part of said auxiliary stage and at least one resistor connected between said base of said third transistor and said second supply terminal, and wherein said control circuit means of said auxiliary stage comprises a fourth transistor having its base connected to said first supply terminal and to a collector of said third transistor and having its emitter and collector respectively connected between said second supply terminal and a base of a fifth transistor which is connected between said first supply terminal and an output terminal of said auxiliary stage.

* * * * *